(12) United States Patent
Kutsuzawa

(10) Patent No.: US 6,337,556 B2
(45) Date of Patent: Jan. 8, 2002

(54) COIL OF CHARGING PADDLE

(75) Inventor: Hidechika Kutsuzawa, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/731,594

(22) Filed: Dec. 7, 2000

(30) Foreign Application Priority Data

Dec. 10, 1999 (JP) ............................................ 11-352083

(51) Int. Cl.[7] .............................................. H01M 10/46
(52) U.S. Cl. ...................................................... 320/108
(58) Field of Search ................................. 320/107, 108, 320/109, 150

(56) References Cited

U.S. PATENT DOCUMENTS 4,848,846 A * 7/1989 Yamada et al.

FOREIGN PATENT DOCUMENTS

JP 2000-182864 6/2000

* cited by examiner

Primary Examiner—Edward H. Tso
(74) Attorney, Agent, or Firm—Morgan & Finnegan, LLP

(57) ABSTRACT

An inductive charging paddle includes a coil, which is located about a core. The coil is connected to an electricity supplying apparatus through a cable. The coil includes a bobbin and a line wound about the bobbin. The line includes a litz wire and a tubing for coating the litz wire. The tubing is made of a heat-shrinkable resin and is heat shrunk for holding strands of the litz wire together. The strands in the litz wire are prevented from rubbing against each other by a simple structure.

18 Claims, 3 Drawing Sheets

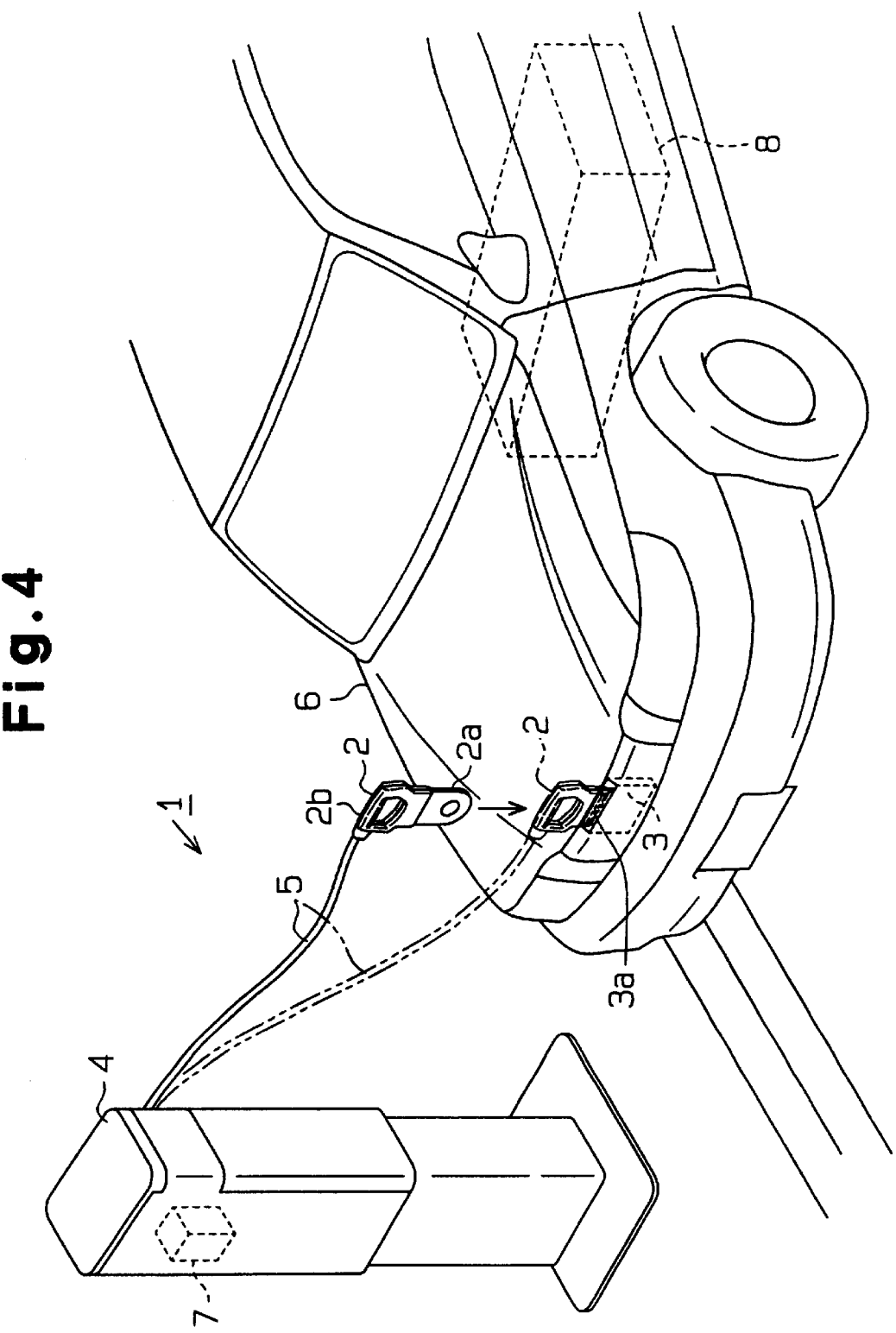

COIL OF CHARGING PADDLE

BACKGROUND OF THE INVENTION

The present invention relates to a coil used in a paddle of an inductive charger coupling for charging a battery of an electric vehicle.

A typical inductive charger coupling for charging electrical vehicle batteries includes a paddle and a receptacle. The paddle is connected to an electricity supplying apparatus by a cable. When charging a battery, the paddle is plugged into the receptacle, which is located in the vehicle. The paddle includes a coil for transmitting electricity. The coil is wound about a core, which is located at a part of the paddle that is plugged into the receptacle. The receptacle includes a coil for receiving electricity. The receptacle coil is wound about a core, which is aligned with the paddle core when the paddle is plugged into the receptacle. Alternating current is supplied to the paddle coil when the paddle is plugged into the receptacle, which induces electricity in the receptacle coil. Accordingly, the vehicle battery is charged.

The paddle coil is made of a litz wire. The litz wire includes approximately one thousand twined and enameled strands, the diameter of each is, for example, 0.1 mm. The enameled strands are fastened by a coating of fine threads. The litz wire reduces heat. The paddle coil is formed by winding the litz wire about the paddle core, for example, four times.

When the paddle vibrates or receives a shock, adjacent parts of the litz wire rub one another. Also, since the fastening force of the thread coating is weak, the enameled strands scrape one another in the litz wire. Therefore, if the paddle is used for a long period, the thread coating of the litz wire and insulation coating of the enameled strands may be partially removed, which may cause a short circuit. To prevent parts of the litz wire in the coil and the strands in the wire from rubbing against one another, the litz wire may be covered by an insulating sheet and then impregnated with resin. This, however, complicates the manufacture and cannot sufficiently prevent the enameled strands within the coating from rubbing against one another.

SUMMARY OF THE INVENTION

Accordingly, it is an objective of the present invention to provide a coil used in a charging paddle that protects surface of a wire in the coil and prevents strands in the wire from rubbing against one another.

To achieve the above objective, the present invention provides a coil used in an inductive charging paddle. The coil is located about a core, which is located in the paddle. The coil is connected to an electricity supplying apparatus through a cable. The coil includes a wire having a bundle of strands and a coating for coating the wire. The coating includes a heat-shrinkable resin and is heat shrunk for holding the strands together.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4 is a perspective view illustrating the charger coupling, which uses the paddle FIG. 1.

DETAILED DESCRIPTION OF THE PREFERRED EMBODIMENTS

Figure 1:
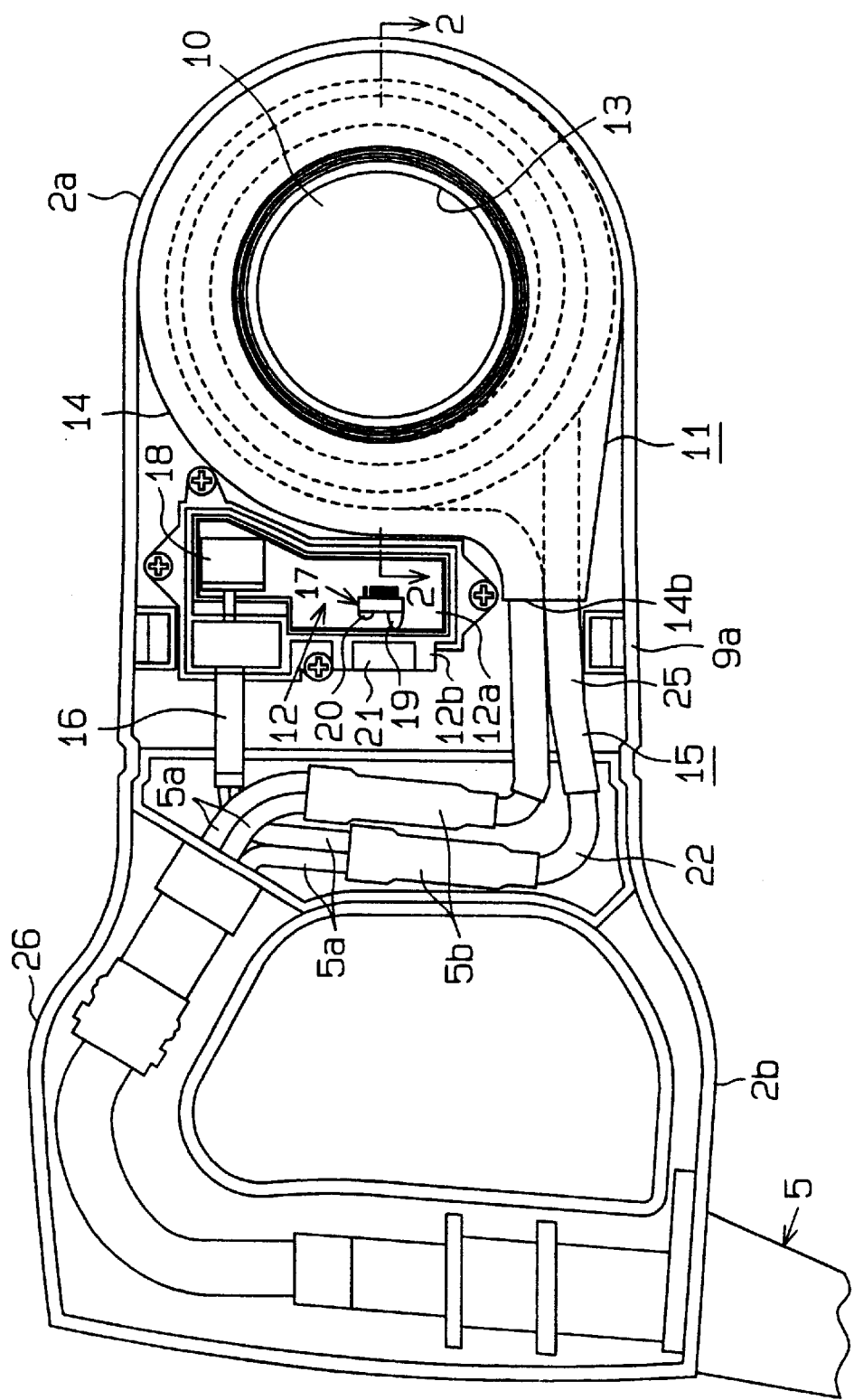
FIG. 1 is a cross-sectional view illustrating a charging paddle according to one embodiment of the present invention.

One embodiment of the present invention will now be described with reference to FIGS. 1 to 4.

As shown in FIG. 4, an inductive charger coupling 1 includes a charging paddle 2 and a receptacle 3. The paddle 2 is connected to an electricity supplying apparatus 4 by a cable 5. The receptacle 3 is located in a predetermined position in a vehicle 6 and is connected to a vehicle battery 8. In this embodiment, the receptacle 3 is located in front of the hood. When charging the battery 8, the paddle 2 is plugged into the receptacle 3.

The electricity supplying apparatus 4 includes a controller 7. The controller 7 controls alternating current supplied to the paddle 2 based on signals transmitted between the paddle 2 and the receptacle 3. The signals include an interlock release signal, which indicates that the paddle 2 is completely plugged into the receptacle 3, and a voltage level signal, which indicates the charging level of the battery 8.

FIG. 1 is a cross-sectional view illustrating the paddle 2. The paddle 2 includes a case 9, a cylindrical transmitting core 10, an annular transmitting coil 11 and a communication controller substrate 12. The coil 11 is located about the core 10. Circuitry on the substrate 12 exchanges signals with a transmitter-receiver (not shown) of the receptacle 3.

The case 9 is made of an infrared-transparent resin and includes a plug portion 2a and a grip 2b. The plug portion 2a is plugged into an opening 3a (see FIG. 4) of the receptacle 3. The case 9 includes two case members 9a, which are welded to each other by vibration bonding.

Figure 2:
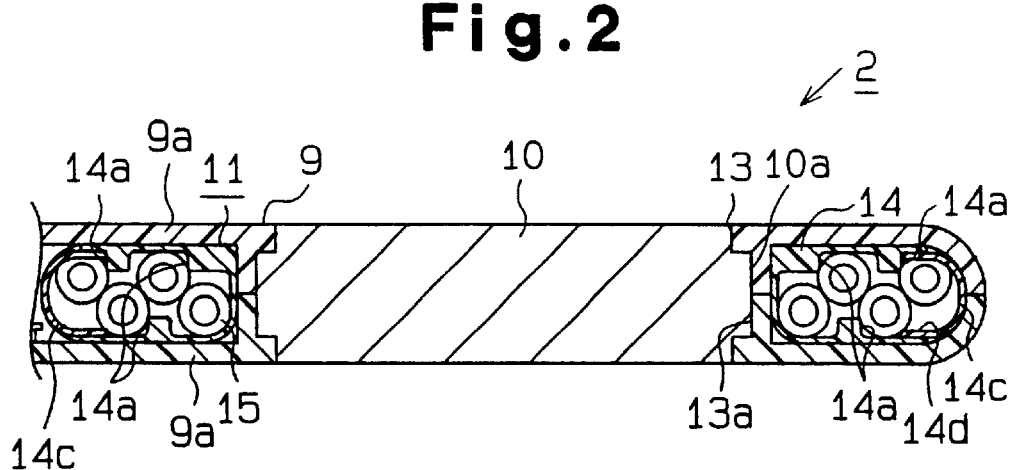
FIG. 2 is a cross-sectional view taken along line 2—2 in FIG. 1.

As shown in FIGS. 1 and 2, a circular opening 13 is formed in the plug portion 2a. The core 10 is fitted in the opening 13 such that an annular projection 10a is fitted in an annular recess 13a formed in the wall of the opening 13.

As shown in FIGS. 1 and 2, the coil 11 is located in the case 9 about the core 10. The coil 11 includes a resin bobbin 14 and a single line 15 wound about the bobbin 14. The bobbin 14 includes a cylindrical body and a pair of flanges, which extend radially from the axial ends of the cylindrical body.

The substrate 12 is housed in a transparent resin box 12b, which is located in the case 9. A circuit board 12a is located on the substrate 12. An infrared transmitter-receiver 17 and a communication circuit 18 are mounted on the circuit board 12a. The infrared transmitter-receiver 17 includes a luminous element 19 and a photodetector 20.

A prism 21 is located on the substrate 12. An infrared light signal from the luminous element 19 is refracted in two opposite directions (both of which are perpendicular to the surface of the sheet of FIG. 1) by the prism 21. One of the refracted signals is received by an infrared transmitter-receiver of the receptacle 3. The photodetector 20 receives an infrared light from the infrared transmitter-receiver of the receptacle 3 through the prism 21. The prism 21 permits the paddle 2 and the receptacle 3 to communicate regardless of which side of the paddle 2 faces the transmitter-receiver of the receptacle 3. Therefore, the paddle 2 needs only one transmitter-receiver 17. The communication circuit 18 includes a filter circuit for reducing noise in signals form the controller 7 and an amplifier for amplifying signals from the controller 7. Instead of infrared, the paddle 2 and the receptacle 3 may exchange radio signals through antennas. Also, the paddle 2 and the receptacle 3 may include both infrared transmitter-receiver and radio antennas.

As shown in FIG. 2, the line 15 is guided by projections 14a formed in the inner surface of the bobbin 14 and is wound four times. The windings of the line 15 are generally radially arranged as shown in FIG. 2. In other words, the line 15 lies approximately in a single plane. A bobbin cap 14c is fitted about the bobbin 14. Most of the line 15 is accommodated in a chamber 14d, which is defined by the inner surface of the bobbin 14 and the bobbin cap 14c. The bobbin 14 and the bobbin cap 14c form a guide.

Figure 3A:
FIG. 3A is a side view illustrating the transmitting coil in the paddle of FIG. 1.
Figure 3B:
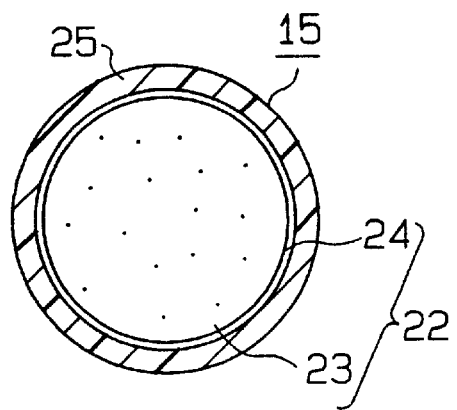
FIG. 3B is the cross-sectional view illustrating the coil of FIG. 3A.

As shown in FIGS. 3A and 3B, the line 15 includes a litz wire 22 and a heat-shrinkable polyurethane tubing 25. The litz wire 22 includes about one thousand twisted, enameled strands 23. The diameter of each enameled strand 23 is about 0.1 mm. The strands 23 are coated by a fine fiber coating layer 24, which is formed by winding fine threads. Specifically, the litz wire 22 includes bundles of the enameled strands 23. The number of the bundles is twenty in this embodiment. Each bundle has tens of enameled strands 23. In this embodiment, each bundle has about fifty strands 23.

The litz wire 22 is coated with the heat-shrinkable polyurethane tubing 25. The tubing 25 coats substantially the whole litz wire 22 except for the ends, which are connected to power lines 5a (see FIG. 1), which extend from the cable 5. When forming the line 15, the litz wire 22 is put in the tubing 25 first. Then, the tubing 25 is heated, which shrinks the tubing 25. The litz wire 22 is held together and protected by the tubing 25.

As shown in FIG. 2, the size of the chamber 14d and the locations of the projections 14a are determined based on the diameter of the line 15, which includes the tubing 25. The position of the line 15 in the chamber 14d is determined by the inner surface of the chamber 14d and the projections 14a. Therefore, the position of the line 15 is stable in the chamber 14d.

As shown in FIG. 1, the bobbin 14 has a port 14b. The ends of the line 15 exit from the port 14b and are connected to the power lines 5a through terminals (not shown) within protective covers 5b. A signal line 16, which also extends from the cable 5, is connected to the circuitry on the substrate 12. The line 15 and the signal line 16 are connected to the electricity supplying apparatus 4 through the cable 5.

The illustrated embodiment has the following advantages.

The litz wire 22 is coated by the heat-shrinkable tubing 25 such that the enameled strands 23 are tightly bundled, which prevents the strands 23 from rubbing against one another. Therefore, the insulation layers of the strands 23 are not broken. Even if the parts of the line 15 rub against one another, the tubing 25 protects the surface. Thus, if the paddle 2 is used for a long period, the line 15 and the strands 23 do not short circuit. Accordingly, the life of the coil 11 is extended, which guarantees the reliability of the paddle 2 for a long period.

Since the paddle 2 is flat, the line 15 is wound in the radial direction about the core 10. The line 15 is held by the bobbin 14. Also, even if the line 15 is moved in the bobbin 14, the tubing 25 protects the surface of the line 15.

The line 15 is placed along the projections 14a in the bobbin 14 before the bobbin 14 is installed in the case 9.

Thus, the line 15 is easily installed because other members of the paddle 2 do not interfere. When the bobbin 14 is installed in the case 9, the position of the line 15 is already determined.

The line 15 is held by the projections 14a in the chamber 14d of the bobbin 14, which prevents the line 15 from moving.

It should be apparent to those skilled in the art that the present invention may be embodied in many other specific forms without departing from the spirit or scope of the invention. Particularly, it should be understood that the invention may be embodied in the following forms.

The heat-shrinkable tubing 25 is made of polyurethane in the illustrated embodiment. However, the tubing 25 may be made of other heat-shrinkable resin such as polyolefin, polyethylene terephthalate, or polyvinyl chloride.

The fine fiber coating layer 24, which coats the twined enameled strands 23, may be omitted.

The number of the enameled strands 23 is not limited to about one thousand as long as the number is sufficient for charging.

The bobbin 14 may be omitted and the coil 11 may be directly housed in the case 9.

In the illustrated embodiment, the line 15 is wound in the radial direction. However, the line 15 may be wound in the axial direction.

The shape of the paddle 2 may be changed. For example, the paddle 2 may be shaped like a gun.

Therefore, the present examples and embodiments are to be considered as illustrative and not restrictive and the invention is not to be limited to the details given herein, but may be modified within the scope and equivalence of the appended claims.

What is claimed is:

1. A coil used in an inductive charging paddle, wherein the coil is located about a core, which is located in the paddle, and wherein the coil is connected to an electricity supplying apparatus through a cable, the coil comprising:

a litz wire comprising a bundle of strands; and a coating for coating the litz wire, wherein the coating comprises a heat-shrinkable resin, and wherein the coating is heat shrunk for tightly holding the strands together.

2. The coil according to claim 1, wherein the coating comprises a tubing.

3. The coil according to claim 1, wherein the coating comprises polyurethane.

4. The coil according to claim 1, wherein the litz wire further comprises a fine fiber layer surrounding the bundle of the strands.

5. The coil according to claim 1, wherein the litz wire lies approximately in a single plane.

6. The coild according to claim 1, wherein the litz wire is wound a plurality of times to form windings and the windings are generally radially arranged.

7. The coil according to claim 6, further comprising a bobbin about which the litz wire is wound.

8. The coil according to claim 7, wherein the bobbin includes a positioner for determining the position of the litz wire.

9. The coil according to claim 8, wherein the bobbin includes a cylindrical body and a pair of opposed flanges, which extend radially from the axial ends of the cylindrical body, wherein the positioner projects from a side of each flange towards the opposite flange.

10. A coil used in an inductive charging paddle, wherein the coil is located about a core, which is located in the paddle, and wherein the coil is connected to an electricity supplying apparatus through a cable, the coil comprising:

a bobbin;

a litz wire wound about the bobbin, wherein the litz wire comprises a bundle of twisted, enameled strands; and a tubing that covers the litz wire, wherein the tubing comprises a heat-shrinkable resin, and wherein the tubing is heat shrunk for tightly holding the strands of the litz wire together.

11. The coil according to claim 10, wherein the litz wire lies approximately in a single plane, and wherein the bobbin includes a projection for determining the position of the litz wire.

12. An inductive charging paddle, comprising:

(a) a core, and (b) a coil located about said core, said coil comprising:

(1) a litz wire comprising a bundle of strands; and (2) a coating for coating the litz wire, wherein the coating comprises a heat-shrinkable resin, and wherein the coating is heat shrunk for tightly holding the strands together, wherein the coil is connected to an electricity supplying apparatus through a cable.

13. The inductive charging paddle according to claim 12, wherein the coating comprises a tubing.

14. The inductive charging paddle according to claim 12, wherein the coating comprises polyurethane.

15. The inductive charging paddle according to claim 12, wherein the litz wire further comprises a fine fiber layer surrounding the bundle of the strands.

16. The inductive charging paddle according to claim 12, wherein the litz wire lies approximately in a single plane.

17. The inductive charging paddle according to claim 12, wherein the litz wire is wound a plurality of times to form windings and the windings are generally radially arranged.

18. The inductive charging paddle according to claim 17, wherein the coil further comprises a bobbin about which the litz wire is wound, wherein the bobbin includes a positioner for determining the position of the litz wire, wherein the bobbin includes a cylindrical body and a pair of opposed flanges, which extend radially from the axial ends of the cylindrical body, and wherein the positioner projects from a side of each flange towards the opposite flange.

* * * * *

UNITED STATES PATENT AND TRADEMARK OFFICE
CERTIFICATE OF CORRECTION

PATENT NO.     : 6,337,556 B2
DATED          : January 8, 2002
INVENTOR(S)    : Hidechika Kutsuzawa It is certified that error appears in the above-identified patent and that said Letters Patent is hereby corrected as shown below:

<u>Title page,</u>
Item [54], please change "COIL OF CHARGING PADDLE", to -- AN INDUCTIVE CHARGING PADDLE AND A COIL USED THEREIN --.

<u>Column 4,</u>
Line 55, please change "coild" to -- coil --.

Signed and Sealed this

Eighteenth Day of June, 2002

*Attest:*

JAMES E. ROGAN
*Attesting Officer*      *Director of the United States Patent and Trademark Office*